US006970873B2

(12) United States Patent
Fu et al.

(10) Patent No.: US 6,970,873 B2
(45) Date of Patent: Nov. 29, 2005

(54) CONFIGURABLE MECHANISM AND ABSTRACT API MODEL FOR DIRECTORY OPERATIONS

(75) Inventors: Chi-Hung Fu, Burlingame, CA (US); Hin Man, Milpitas, CA (US); Dilli Dorai, Sunnyvale, CA (US); Prasanta Behera, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 698 days.

(21) Appl. No.: 09/922,190

(22) Filed: Aug. 2, 2001

(65) Prior Publication Data

US 2003/0028752 A1 Feb. 6, 2003

(51) Int. Cl.[7] .............................................. G06F 17/30
(52) U.S. Cl. ..................... 707/100; 707/102; 707/3; 707/200
(58) Field of Search ......................... 707/1, 3, 10, 100, 707/102, 200; 715/500, 513

(56) References Cited

U.S. PATENT DOCUMENTS

| 5,838,965 | A | * | 11/1998 | Kavanagh et al. | ...... 707/103 R |
| 6,418,446 | B1 | * | 7/2002 | Lection et al. | .......... 707/103 R |
| 6,480,865 | B1 | * | 11/2002 | Lee et al. | .................... 715/523 |
| 6,609,121 | B1 | * | 8/2003 | Ambrosini et al. | ............ 707/3 |
| 6,615,223 | B1 | * | 9/2003 | Shih et al. | .................. 707/201 |
| 6,635,089 | B1 | * | 10/2003 | Burkett et al. | .............. 715/513 |

* cited by examiner

Primary Examiner—Shahid Alam
Assistant Examiner—Cam Y T. Truong
(74) Attorney, Agent, or Firm—Osha Liang LLP

(57) ABSTRACT

A computing device including a method of adding to a directory information tree involving the steps of accessing a template name, reading a template according to the accessed template name, the template including structural information of the directory information tree, receiving a first set of attributes from an application program, the received first set of attributes not including a location within the directory information tree, constructing an entry including the received first set of attributes, and a destination location within the directory information, the destination location generated using the structural information, and adding the constructed entry to the directory information tree at the destination location.

19 Claims, 9 Drawing Sheets

201 DN: UID=TEDISON, OU=EMPLOYEE, O=BIG CORP, C=US
202 FN: TOM
203 SN: EDISON
204 OBJECTCLASS:TOP
205 OBJECTCLASS: INETORGPERSON
206 OBJECTCLASS: PERSON
207 OBJECTCLASS: INETUSER
208 OBJECTCLASS: NSMANAGEDPERSON
209 UID: TEDISON
210 MAIL: TEDISON@BIG.COM
211 MAIL: TOM@HOME.COM
212 DEPT: ENGINEERING

*FIG. 2*

```
301         LDApConnection ldc = null;
302
303     // get a connection
304         ldc = ... <Snip>
305
306     // Now add the user
307         String dn = "uid=tedison, ou=Employee, o=Big Corp, c=US"
308         LDAPAttributeSet attrSet = new LDAPAttributeSet();
309         attrSet.add(new LDAPAttribute("objectclass", "top"));
310         attrSet.add(new LDAPAttribute("objectclass", "Person"));
311         attrSet.add(new LDAPAttribute("objectclass", "inetUser"));
312         attrSet.add(new LDAPAttribute("objectclass", "nsManagedPerson"));
313         attrSet.add(new LDAPAttribute("uid", "tedison"));
314         attrSet.add(new LDAPAttribute("mail", "tedison@big.com"));
315         attrSet.add(new LDAPAttribute("mail", "tom@home.com"));
316         attrSet.add(new LDAPAttribute("dept", "engineering"));
317         attrSet.add(new LDAPAttribute("ou", "employee"));
318         attrSet.add(new LDAPAttribute("sn", "Edison"));
319         attrSet.add(new LDAPAttribute("fn", "Tom"));
320         LDAPEntry entry = new LDAPEntry(dn,attrSet);
321
322     // Now add the entry
323         ldc.add(entry);
```

*FIG. 3*

```
501  <ServiceConfig name="BasicUser" id="Creationobjects">
502      <AttributeValuePair> <Attribute name="name" />
503          <Valve>BasicUser</Value>
504      </AttributeValuePair>
505      <AttributeValuePair> <Attribute name="required" />
506          <Value>objectClass=top</Value>
507          <Value>objectClass=person</Value>
508          <Value>objectClass=inetUser</Value>
509          <Value>objectClass=nsManagedPerson</Value>
510          <Value>uid</Value>
511          <Value>fn</Value>
512          <Value>sn</Value>
513          <Value>dept</Value>
514          <Value>type</Value>
515      </AttributeValuePair>
516      <AttributeValuePair> <Attribute name="optional" />
517          <Value>userpassword</Value>
518          <Value>telephonenumber</Value>
519          <Value>givenname</Value>
520          <Value>displayname</Value>
521          <Value>title</Value>
522          <Value>description</Value>
523          <Value>mail</Value>
524          <Value>postaladdress</Value>
525      </AttributeValuePair>
526      <AttributeValuePair> <Attribute name="namingattribute" />
527          <Value>uid</Value>
528      </AttributeValuePair>
529      <AttributeValuePair> <Attribute name="validated" />
530          <Value>mail=foo.com.validation.MailAddressValidator</Value>
531      </AttributeValuePair>
532      <AttributeValuePair> <Attribute name = "Location mapper" />
533          <value>
534              <mapfrom>  debt=emplyee </mapFrom>
535              <mapto>    ou=employee<mapTo>
536          </Value>
537      <AttributeValuePair>
538  </ServiceConfig>
```

*FIG. 5*

```
601     // fill out at least the needed information only
602         LDAPAttributeSet attrSet = new LDAPAttributeSet();
603         attrSet.add(new LDAPAttribute("uid", "tedison"));
604         attrSet.add(new LDAPAttribute("fn" , "Tom"));
605         attrSet.add(new LDAPAttribute("sn" , "Edison"));
606         attrSet.add(new LDAPAttribute("dept" , "engineering"));
607         attrSet.add(new LDAPAttribute("type" , "employee"));
608         attrSet.add(new LDAPAttribute("mail" , "tedison@bigcorp.com"));
609         attrSet.add(new LDAPAttribute("mail" , "tom@home.com"));
610
611     // create the user
612         User newPerson = new User (BasicUser, attrSet);
613
614     // instantiate the organization
615         Organization bigcorp = new Organization (... <Snip>);
616
617     // add the user to the LDAP database
618         bigcorp.add (newPerson);
```

*FIG. 6*

```
801    <ServiceConfig name="BasicUserSearch" id="SearchObjects">
802        <AttributeValuePair> <Attribute name="name" />
803            <Value> BasicUserSearch </Value>
804        </AttributeValuePair>
805        <AttributeValuePair> <Attribute name="searchfilter" />
806            <Value>objectclass=nsMangedPerson</Value>
807        </AttributeValuePair>
808        <AttributeValuePair> <Attribute name="attrs" />
809            <Value>uid</Value>
810            <Value>fn<Value>
811            <Value>sn<Value>
812        </AttributeValuePair>
813    <ServiceSubConfig>
```

*FIG. 9*

CONFIGURABLE MECHANISM AND ABSTRACT API MODEL FOR DIRECTORY OPERATIONS

BACKGROUND OF THE INVENTION

1. Field of the Invention

The present invention relates to the field of computer information directory operations. More specifically, embodiments of the present invention relate to the querying and updating of elements in a directory information tree, such as LDAP.

2. Related Art

A directory is like a database, but, in general, contains more descriptive, attribute-based information, such as a lists of employees within organizations that include telephone numbers and computer login IDs. Typically, information in a directory is read much more often than it is written. Hence, directories are tuned for high-volume lookup or search operations, with fast response times, but updating is still an important aspect of directory services. Directory information is typically distributed over many computers in order to increase availability and reliability, while reducing response time.

Directory services are currently provided by a variety of methods, the various methods addressing: how to store various kinds of information; how the information can be referenced, queried and updated; and how it is protected from unauthorized access, etc. Some directory services are local, providing service to a restricted context (e.g., the Unix "finger" service on a single machine). More complex services are global, providing service to a much broader context (e.g., the Internet). Global directory services are usually distributed, meaning that the data is spread across many machines, all of which cooperate to provide the directory service.

The most common global directory model currently in use is called LDAP, which stands for the Lightweight Directory Access Protocol. The present invention is described as an improvement over LDAP, but the present invention can be applied to any directory service. LDAP is a directory service protocol that runs over TCP/IP. The LDAP protocol, as recommended by the IETF, (found at http://www.ieff.org/internet-drafts/draft-ietf-ldapext-ldapjava-api-13.txt) has become a standard for directory operations.

The LDAP directory service model is based on entries. An entry is a collection of attributes, and a particular collection has a unique identifier called a "distinguished name" (DN). The DN is used to refer to the entry unambiguously. Each of the entry's attributes has an attribute name and one or more values. The attribute names are typically mnemonic strings, like "cn" for common name, or "mail" for email address. The values depend on the type of attribute. For example, an "mail" attribute might contain the value john@joe.com, while a "jpegPicture" attribute would contain a picture in binary JPEG format, or could be defined to be a pointer to a JPEG picture.

In a directory information tree, directory entries are arranged in a hierarchical tree-like structure that reflects political, geographic and/or organizational boundaries. For example, entries representing countries could appear at the top of the tree, closest to the root. Below countries, entries represent states or national organizations. Below those organizations, the entries could represent people, organizational units, printers, documents, or just about anything else.

FIG. 1 shows an exemplary directory information tree. FIG. 2 is an exemplary entry corresponding to one of the entries shown in FIG. 1, the entry shown as attributes paired with values. Each line in FIG. 2 is numbered for reference purposes, and each text-based figure in this specification has all of its lines numbered. FIG. 3 is an exemplary excerpt of prior art software source code for adding the entry of FIG. 2 to a directory information tree. At line 307, the DN for the entry is specified so as to describe the location within the directory information tree (of FIG. 1), this location being the list of branches taken from the root of the tree.

LDAP uses a directory information tree. In addition, LDAP allows you to control which attributes are required and allowed in an entry through the use of a special attribute called objectclass. The values of the objectclass attribute determine the schema rules the entry must obey.

An entry is referenced by its DN, which is constructed by taking the name of the entry itself (called the relative distinguished name, or RDN) and concatenating the names of its ancestor entries.

LDAP defines operations for interrogating and updating the directory. Operations are provided for adding and deleting an entry from the directory, changing an existing entry, and changing the name of an entry. Most of the time, though, LDAP is used to search for information in the directory. The LDAP search operation allows some portion of the directory to be searched for entries that match some criteria specified by a search filter. Information can be requested from each entry that matches the criteria.

For example, you might want to search the entire directory subtree below the level called "BigCorp" for people with the name "Edison", retrieving the email address of each entry found. LDAP lets you do this easily, assuming you know how the directory information tree is structured. In this specification, structural information refers to any data that describes the branching of the directory information tree or attribute values that aid in directory operations.

LDAP directory service is based on a client-server model. One or more LDAP servers contain the data making up the LDAP directory information tree. An LDAP client connects to an LDAP server and asks it a question. The server responds with the answer, or with a pointer to where the client can get more information (typically, another LDAP server). No matter which LDAP server a client connects to, it sees the same view of the directory. A name presented to one LDAP server references the same entry it would at another LDAP server. This is an important feature of a global directory service, like LDAP.

The database managers (where the directory information trees are stored) can be spread across many servers, and can run different types of database manager software.

A major shortcoming in current directory services is the need for application programs to specify an entire DN, requiring the application to "know" the structure of the directory information tree. For example, when an application adds an entry to a directory information tree, the destination location within the hierarchical structure of the directory information tree must be specified. As a specific example using LDAP, if an entry for "Tom Edison" needs to be added to a directory information tree (as shown in FIG. 1), a DN for the entry would be "uid=tedison, ou=employee, o=Big Corp, c=US" (as shown at line 307 in FIG. 3), and this must be specified by the application. If the structure of the directory information tree is changed, the application would probably need to be changed, too. Since rewriting applications is a significant cost and a source of possible errors, it would be highly advantageous to avoid the rewriting. It is the objective of the present invention to solve this major shortcoming.

SUMMARY OF THE INVENTION

Accordingly, embodiments of the present invention provide a configurable mechanism and abstract API model for directory operations. The present invention allows an application computer program to be written independently of the structure of a directory information tree. In other words, an application can be written, then if or when the structure of the directory information tree is changed, the application does not need to be rewritten. The structured rule of the directory information tree is specified in a template. The template can be a file or an object or any mechanism to store and retrieve information and also used by an API. If the structure of the directory information tree is changed, the template is changed, but the application is not changed. The present invention significantly eases the task of maintaining a directory service by eliminating the work to rewrite and test applications when the structure of a directory information tree is changed, and also eases the task by eliminating errors that could occur when an application is rewritten. The present invention provides these advantages and others not specifically mentioned above but described in the sections to follow.

A method is described herein for an application program interface (API) that provides an abstract representation of the directory. An application program makes calls to the API, and the API software uses a template for directoryinformation-tree-specific information. For example, an application can call an API procedure that adds a entry to a directory, and the API software uses the template to generate the location within the directory information tree where the entry is to be added. Furthermore, the API software uses the template to determine default attribute values, required attributes, and programs to verify attribute values. Similarly, data in the template can be used for directory query operations. The template description can take any computer readable form, but is preferentially an XML file. A plurality of other file types can also be used.

The template mechanism is to facilitate application for control of building good objects before the application finally passes down to LDAP or Directory Server for persistency. The template serves many purposes. Templates serve as a guideline for object creation of required and optional attributes. This is done similar to LDAP schema of MUST and MAY attributes. It is done in such a way that default templates are registered with a template manager. At run time, applications have complete control of using the default behavior of default templates for object creation. For customized template of application domain objects to be managed by console, customers can define their own object templates and leverage the template design in catching run time problems with object violation upon creation.

Templates are designed with user convenience in mind. Wherever appropriate, default values of both required and optional attributes are supported in CreationTemplate so that mundane LDAP attribute values such as that for "objectclass" can be provided for the proper object creation in directory server. The application is relieved from the burden of finding the right objectclasses to build the object.

Templates are useful as a guideline for search. One can build generic purpose of SearchTemplate to go with certain type of objects. For a user, there is the BasicUserSearchTemplate that captures the essential LDAP search filter that looks up the relevant user objects such as that in (&(objectclass=inetOrgPerson) (userstatus=active)).

Templates serve as a place for putting attribute validation logic. Since the template guides an application to build proper objects, the same principle is used in placing validation routine lookup in the CreationTemplate so that the application can place backend validation logic in capturing valid user data before it hits on the persistence store in Directory Server.

Embodiments include the above and further comprise the steps of: passing a template name to an API, the named template comprising structural information of the directory information tree; the API software receiving the template name and reading a template according to the received template name, the template comprising: i) structural information of the directory information tree; ii) a second set of attributes, the second set comprising default attribute values; iii) a third set of attributes that are required to have assigned values; and iv) information specifying a verification program; requesting attributes from the API.

Embodiments further include the above and wherein the method also includes the step of the API software responding with the appropriate list of attributes; passing a first set of attributes to the API, the passed first set of attributes not including a location for the entry within the directory information tree, and the API software receiving the first set of attributes; the API software verifying of one or more attributes of the first set of attributes using the verification program; the API software constructing the entry comprising: i) the received first set of attributes; ii) the second set of attributes; and iii) a destination location within the directory information, the destination location generated using the structural information.

Embodiments further include the above and wherein the method also includes the step of the API software detecting the condition of the constructed entry being unacceptable for addition to the directory information tree; at least one the condition being the absence of a value for any attribute in the third set of attributes, and if the constructed entry is unacceptable, generating an error condition; and the API software adding the constructed entry to the directory information tree at the destination location. This list of steps indicates a distinction between steps taken in the application and the API software, but the steps can occur in either place, as specific implementation or embodiments are free to optimize the location and order of the steps. A feature of the invention is the use of a template.

BRIEF DESCRIPTION OF THE DRAWINGS

FIG. 2 is an exemplary entry corresponding to one of the entries shown in FIG. 1, the entry shown as attributes paired with values.

FIG. 3 is an exemplary excerpt of prior art software source code for adding the entry of FIG. 2 to a directory information tree.

FIG. 5 is an exemplary excerpt from a template in XML format used for adding an entry to a directory information tree, in accordance with an embodiment of the present invention.

FIG. 6 is an exemplary excerpt of software source code in accordance with an embodiment of the present invention for adding the entry of FIG. 2 to a directory information tree by using a template.

FIG. 9 is an exemplary excerpt from a template in XML format used for querying a directory information tree, in accordance with an embodiment of the present invention.

DETAILED DESCRIPTION OF THE INVENTION

In the following detailed description of the present invention, a configurable mechanism and abstract API model for directory operation, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, program, etc., is here, and generally, conceived to be a self-consistent sequence of steps or instructions leading to a desired result. Initiating a procedure is done by calling it, and input is said to be passes to the procedure. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, information, or the like. Such signals can be said to be stored in files and transmitted, communicated, distributed, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
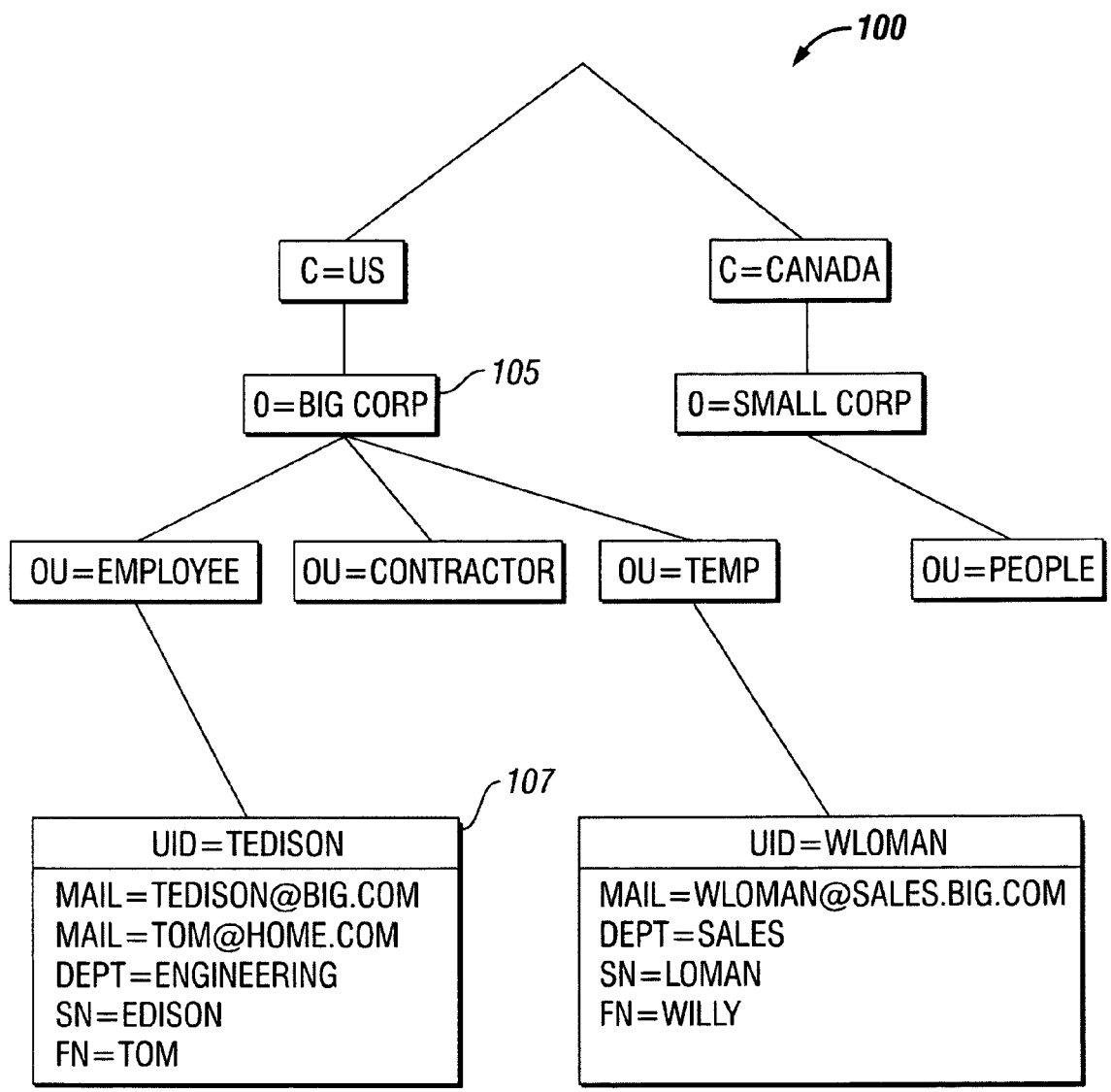
FIG. 1 is an exemplary directory information tree with two entries.

A Configurable Mechanism and Abstract API Model for Directory Operation in Accordance with Present Invention FIG. 1 is an example of a directory information tree 100 (a very simple tree, used for illustration purposes), including a structure for Big Corp 105. In this example, "c" represents "country", "o" represents "organization", "ou" represents "organizational unit", "uid" represents "user identifier", "sn" is "surname", "fn" is "first name", and "dept" is "department". In this example, the "tedison" entry 107 could have been added to the directory information tree 100 by executing the prior art application software shown in FIG. 3.

The software 301–323 gets an LDAP connection 301 and 304, declares 307 a string for the DN, creates 308 an attribute set object, adds 309319 attribute-value pairs to the attribute set object, creates 320 a new entry object, and then adds 323 the entry to the LDAP directory information tree. The DN string 307 (except for the entry specific portion "uid=tedison") must generally be coded into the application because the application must specify a location within the directory information tree for the entry.

Likewise, the objectclass values (e.g., "inetUser" 311 and nsManagedPerson 312) are coded, as well as attribute names (e.g., "dept" 316 and "sn" 318). Entry-specific attribute values 313–319, such as "tedison" 313 and "Edison" 318, would not be hard-coded, but would typically be values obtained as input from the user of the application. A typical application could use a browser to obtain the user input that would be used as attribute values.

Figure 4:
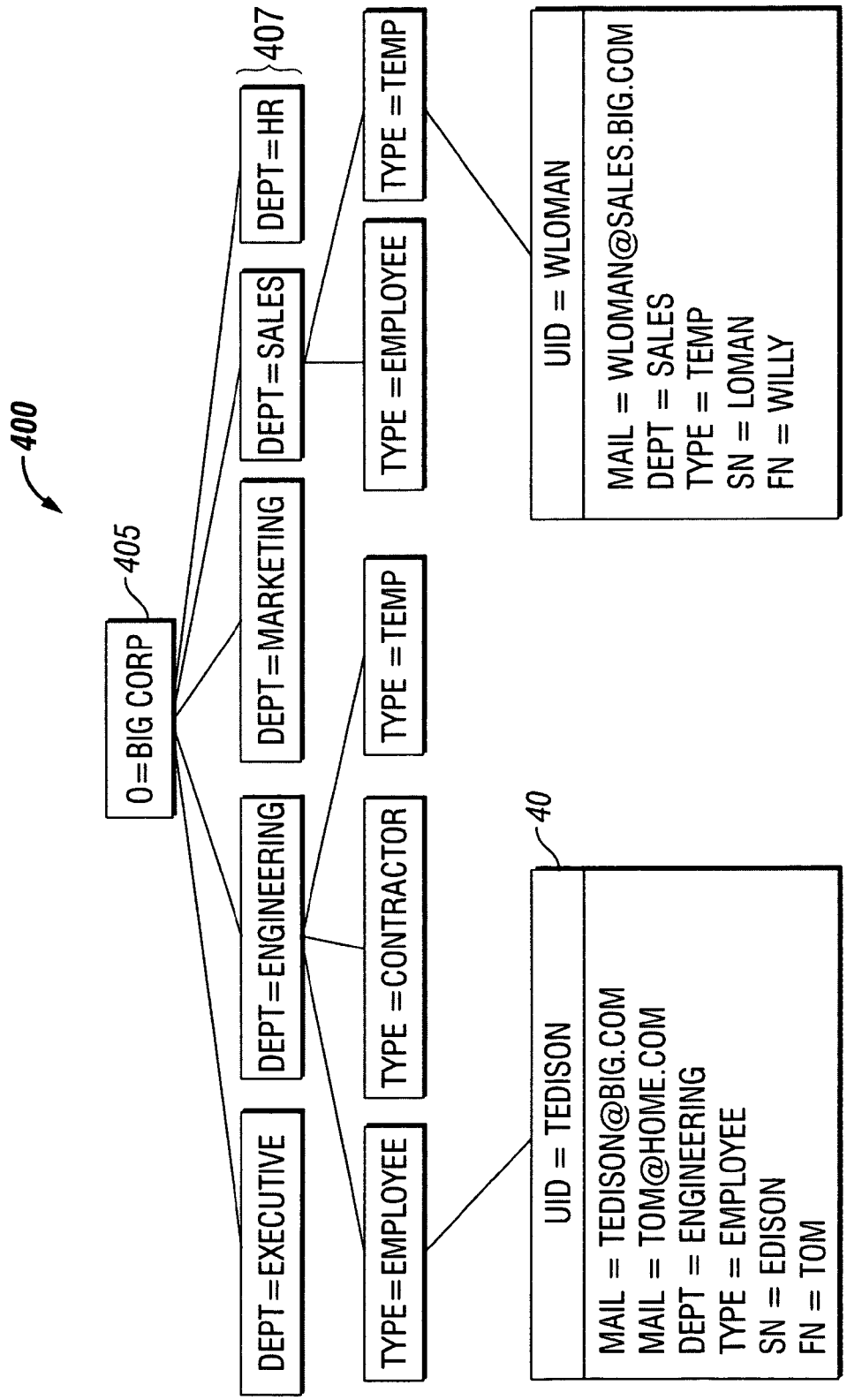
FIG. 4 is an exemplary directory information tree with two entries.

The structure of a directory information tree can change, and typically does change over the life of a directory service. FIG. 4 is another example directory information tree 400, and is shown as a way the directory information tree 100 of FIG. 1 could be changed. In the examples, the structure for "Big Corp" 105 and 405 is altered by changing the "ou" attribute name to "type", and adding another layer to the tree represented by the attribute "dept" 407. If these changes are made to the directory information tree, then the software in FIG. 2 would no longer function properly.

One aspect of the present invention is a template based mechanism that includes one or more templates, to add entries or search for entries (e.g. add a user, query for phone numbers, delete a person, etc.) and comprising the attribute names, default values, and a list of the required attributes needed for the operation. The template can take many formats, generally in some type of human readable form, such as an ASCII file. The preferred format of the template is XML, because of XML's flexibility, extensibility, and the availability of tools for generating and checking XML files. The XML allows the description of complex structure as well as a mechanism to enforce schema (e.g., via DTD). XML is a well defined standard from W3C.

FIG. 5 is a portion of an exemplary template in XML format, in accordance with an embodiment of the present invention; this portion showing the template for creating a "BasicUser" entry, as named at line 501, and bracketed by the "ServiceConfig" tags at lines 501 and 532. The XML tags "<AttributeValuePair>" and "</AttributeValuePair>" are used to bracket "<Value>" and "</Value>" tags, as seen at 502–504, 505–515, 516–525, 526–528, and 529–531. The first set 502–504 specifies the name of this creation template, which is "BasicUser" 503. The second set 505–515 specifies the required attributes for the entry, and supplies default values 506–509 for some of the attributes. The third set 516–525 specifies the optional attributes for the entry. The fourth set 526–528 specifies the naming attribute (i.e., the RDN), which is the attribute that distinguishes the entry from other entries located at the same place within the directory information tree. The fifth set 529–531 specifies programs for validating attribute values, and the example shows a program 530 that checks an email address for compliance with the RFC822 format.

FIG. 6 shows an exemplary section of application source code 601–618 in accordance with an embodiment of the invention. An attribute set object is created 602. Attribute-value pairs are added 603–609 to the attribute set object, but when this 603–609 is compared to the corresponding part of the prior art 309–319, the code 603–609 of the present invention has significant advantages. First, the "objectclass" values 309–312 are not specified at all, and second, the DN 307 is not specified, either. These are supplied by the API 707 and template 709, as described subsequently. The code 601–618 creates 615 a user object of the type "BasicUser", instantiates 612 the organization (e.g., makes a connection to an LDAP server, using appropriate parameters that are not shown), and adds 618 the user to the LDAP database.

Figure 7:
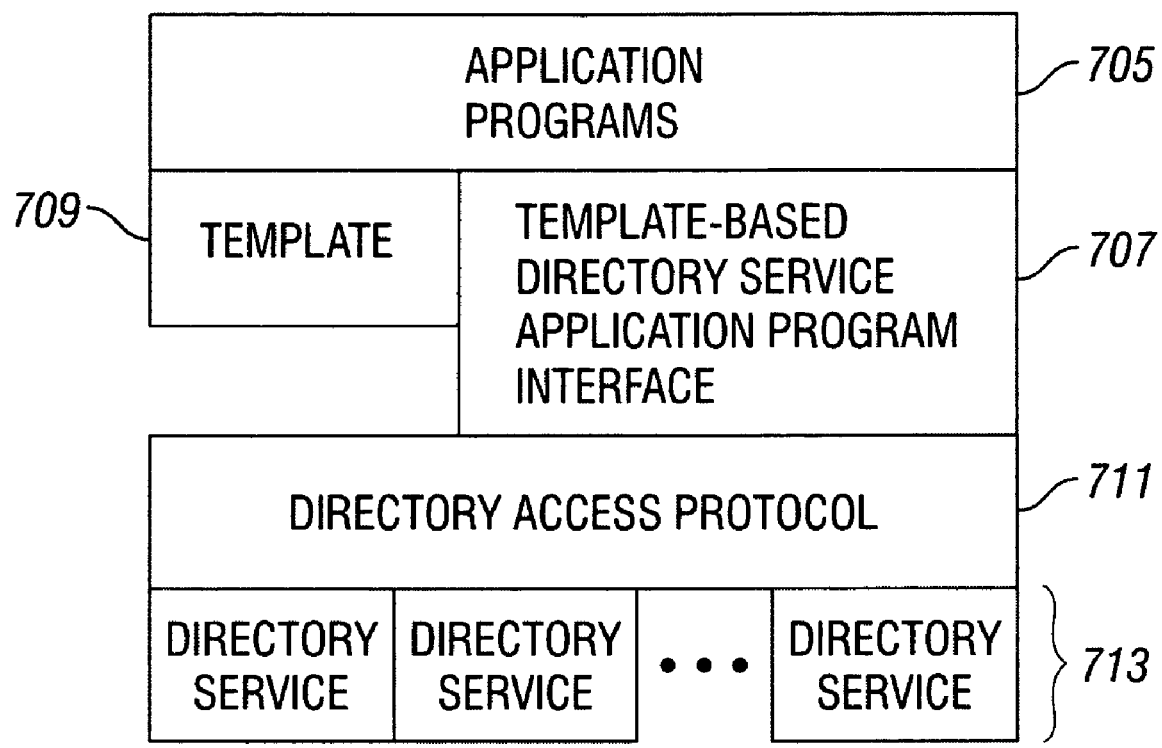
FIG. 7 is a diagram of software layers in accordance with an embodiment of the present invention.

The object classes "Person" 310, "inetUser" 311, . . . , are part of an innovative template-based directory service API 707 in accordance with an embodiment of the present invention. FIG. 7 is a diagram of software layers in accordance with an embodiment of the present invention, including application programs 705, the innovative API 707, the innovative template 709, a directory access protocol 711 (such as LDAP), and one or more directory services 713 (running on servers). The object classes, functions, and/or procedures that are part of the API 707 read the template 709 to obtain the information that must be added to the information received from the application program 705 in order to complete all the information necessary for the directory access protocol 711. In an alternate embodiment of the invention, the template based directory service API 707 encompasses the directory access protocol 711 as a single block of software, but still accesses the template 709.

A validation program can be any program accessible to the API 707. Therefore, as some examples, a validation program can be executable binary or scripts, residing on the same computer, residing on a server, or accessible over the Internet. Hence, the value of an attribute-value pair that specifies a validation program simple needs to "point" to the validation program so the API 707 can call it, as shown at line 530.

Figure 8:
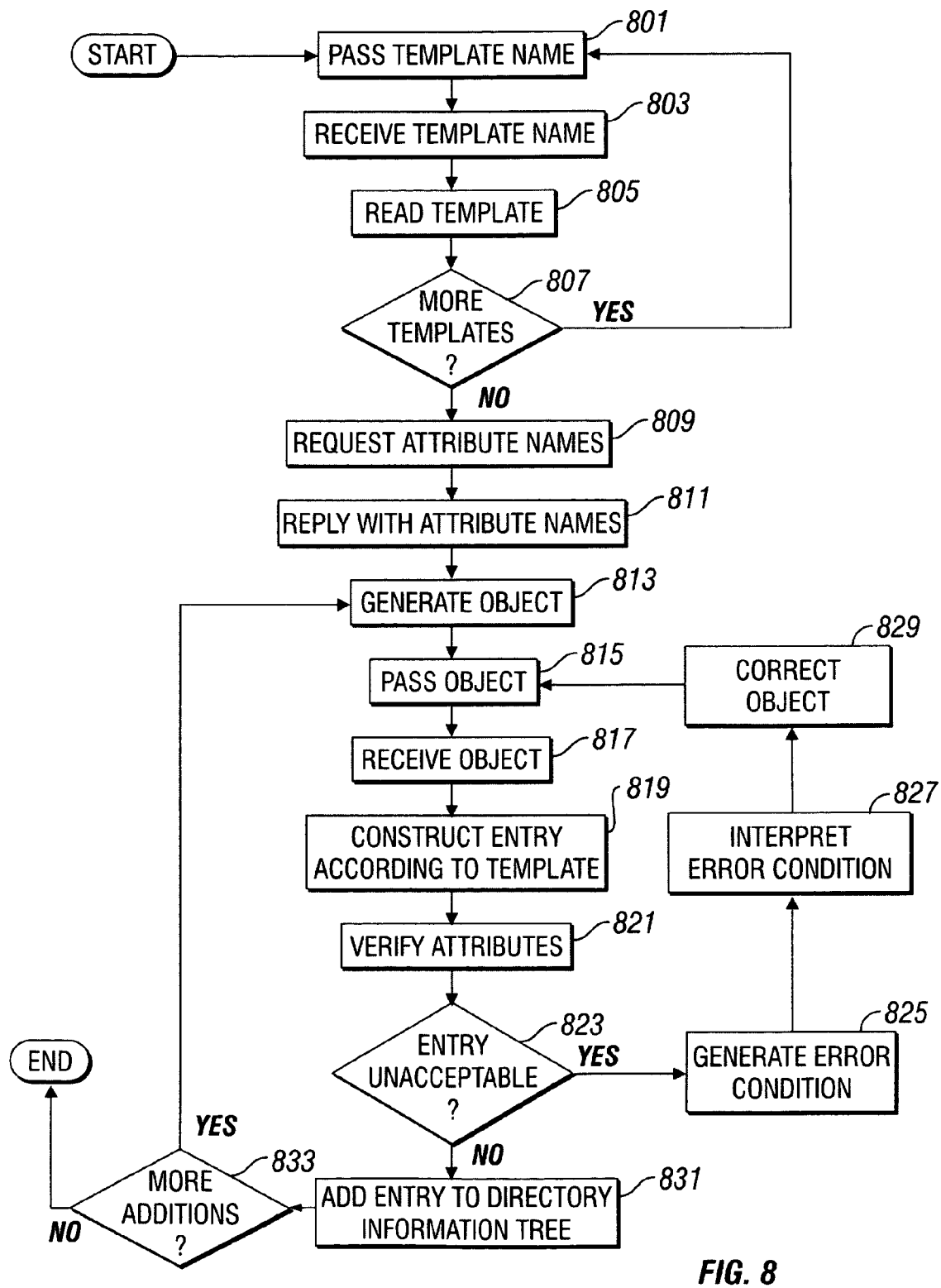
FIG. 8 is a flow diagram in accordance with an embodiment of the present invention for adding an entry to a directory information tree by using a template.

FIG. 8 is a flow diagram in accordance with an embodiment of the present invention for adding an entry to a directory information tree by using a template. The steps shown in FIG. 8 are performed by the application programs 705 and the innovative API 707.

The application 705 passes 801 a template name to the API 707, the named template 709 comprising structural information of the directory information tree. The API 707 receives 803 the template name and reads the template 709 according to the received template name, the template 709 comprising: i) structural information of the directory information tree; ii) a second set of attributes, the second set comprising default attribute values; iii) a third set of attributes that are required to have assigned values; and iv) information specifying a verification program. The API 707 reads 805 the template 709 and creates an internal data structures as necessary, according to standard practices in the software arts. If 807 more templates 709 are to be used, each one is read 805.

For attribute names to be used in the application 705, the preferred approach is for the application 705 to request 809 attributes from the API 707, and for the API 707 to reply 811 with the appropriate list of attributes as read from the template 709, thereby allowing the application to generate attribute value pairs (e.g., 603–609) wherein the attribute names are stored in variables. Alternatively, the application 705 can read the template 709 directly. As another alternative, the names of attributes can be hard coded into the application, but this is not a desirable solution, as the attribute names could be changed or the number of attributes could be increased.

The application 705 generates an object that comprises data it 705 wishes to include in an entry (not including structural information of the directory information tree), which is generally done by acquiring user input. As a specific example of an application, a browser-based application could be made for adding new employees to an existing directory information tree. The application 705 would request 809 and receive the attribute names from the API 707, build a web page with fill-in blanks for attribute values, receive the values as user input, and, from the user input, create attribute-value pairs needed to create the new entry. It would be, however, inconvenient for the user if the application 705 displayed attribute names (e.g., the application would display "sn" and the user would need to know this means "surname"), and some users would not know what the attribute name means. To solve this, the template 709 can include a translation table for converting attribute names into strings that users could understand. Alternatively, this translation table could be in a separate file. As another alternative, attribute-value pairs in the template 709 could be replaced by attribute-value-string triplets, where the string is a short description of the attribute. With any of these solutions, an application could be completely free of hard-coding of attribute names, attribute values, attribute description strings, and directory information tree structure.

Continuing with the description of FIG. 8, the application 705 passes 815 a first set of attributes to the API 707 as part of the generated object. This passed first set of attributes does not include a location for the entry within the directory information tree. The API 707 receives 817 the first set of attributes, constructs 819 an entry, and can verify 821 received attribute values by using verification programs specified in the template (e.g., as specified in FIG. 5, line 530).

The constructed 819 entry comprises: i) the received first set of attributes; ii) the second set of attributes, as read from the template 709; and iii) a destination location within the directory information, the destination location generated using the structural information in the template.

The API 707 detects 823 the condition of the constructed 819 entry being unacceptable for addition to the directory information tree. The API 707 can do this 823 by checking for the absence of a value for any attribute in the third set of attributes (i.e., the required attributes), through the use of verification programs 821, or by any other rule or test included in the API 707. If 823 the constructed 819 entry is unacceptable, an error condition is generated 825 by the API 707, and the application 705 interprets 827 the error condition and corrects 829 the error. If 824 the entry is acceptable, the API 707 adds 831 the constructed 819 entry to the directory information tree at the destination location, generally done by a directory access protocol, such as LDAP.

The steps of FIG. 8 as just describes indicate a distinction between steps taken in the application 705 and the API 707, but many of the steps can occur in either place, as specific implementation or embodiments are free to optimize the location and order of the steps. The critical feature of the invention is the use of a template 709.

Template Based Search

FIG. 9 is a portion 801–813 of an exemplary template in XML format, in accordance with an embodiment of the present invention, this portion showing the template for searching the directory information tree. The template is called "BasicUserSearch", as named at line 801, and bracketed by the "ServiceConfig" tags at lines 801 and 813. The search looks for entries with the value of "nsManagedPerson" assigned to the attribute objectclass.

The above code excerpts are shown in an object-oriented language, but this is only for example purposes. The software can be written in any computer language.

The preferred embodiment of the present invention, a configurable mechanism and abstract API model for directory operations, is thus described. While the present invention has been described in particular embodiments, it should be appreciated that the present invention should not be construed as limited by such embodiments, but rather construed according to the below claims.

What is claimed is:

1. In a computing device, a method of adding to a directory information tree comprising:
   a) accessing a template name;
   b) reading a template according to said accessed template name, said template comprising i) structural information of said directory information tree, ii) a second set of attributes, said second set comprising default attribute values and iii) a third set of attributes, said third set comprising attributes that are required to have assigned values;
   c) receiving a first set of attributes from an application program, said received first set of attributes not including a location within said directory information tree;
   d) constructing a constructed entry comprising: i) said received first set of attributes; and ii) a destination location within said directory information, wherein said destination location is generated using said structural information;
   e) adding said constructed entry to said directory information tree at said destination location;
   f) detecting the condition of said constructed entry being unacceptable for addition to said directory information tree; at least one said condition being the absence of a value for any attribute in said third set of attributes;
   g) if said constructed entry is unacceptable, generating an error condition; and
   h) adding said constructed entry to said directory information tree at said destination location.

2. A method as described in claim 1 wherein said template further comprises a second set of attributes, said second set comprising default values for inclusion in said constructed entry.

3. A method as described in claim 1 wherein said template further comprises a third set of attributes, said third set comprising attributes that are required to have assigned values.

4. A method as described in claim 1 wherein said template further comprises information specifying a verification program for verifying one or more attributes of said first set of attributes.

5. A method as described in claim 1 wherein said template further comprises:
   i) a second set of attributes, said second set comprising default values for inclusion in said constructed entry;
   ii) a third set of attributes, said third set comprising attributes that are required to have assigned values; and
   iii) information specifying a program for verifying one or more attributes of said first set of attributes.

6. A method as described in claim 5 wherein said template is an XML file.

7. A method as described in claim 1 further comprising: detecting the condition of said constructed element being unacceptable for addition to said directory information tree.

8. A method as described in claim 1 wherein said template is an XML file.

9. A method as described in claim 1 wherein said directory information tree is an LDAP directory.

10. A computer readable medium having instructions stores therein for implementing a program module that directs the addition of an entry to a directory information tree, to function in a specified manner, said instructions for:
    a) accessing a template name;
    b) reading a template according to said received template name, said template comprising i) structural information of said directory information tree, ii) a second set of attributes, said second set comprising default attribute values and iii) a third set of attributes, said third set comprising attributes that are required to have assigned values;
    c) receiving a first set of attributes from an application program, said received first set of attributes not including a location within said directory information tree;
    d) constructing an entry comprising
       i) said received first set of attributes; and
       ii) a destination location within said directory information, wherein said destination location is generated using said structural information; and
    e) adding said constructed entry to said directory information tree at said destination location
    f) detecting the condition of said constructed entry being unacceptable for addition to said directory information tree; at least one said condition being the absence of a value for any attribute in said third set of attributes;
    g) if said constructed entry is unacceptable, generating an error condition; and
    h) adding said constructed entry to said directory information tree at said destination location.

11. A computer readable medium as described in claim 10 wherein said template further comprises a second set of attributes, said second set comprising default values for inclusion in said constructed entry.

12. A computer readable medium as described in claim 10 wherein said template further comprises a third set of attributes, said third set comprising attributes which are required to have assigned values.

13. A computer readable medium as described in claim 10 wherein said template further comprises information specifying a verification program for verifying one or more attributes of said first set of attributes.

14. A computer readable medium as described in claim 10 wherein said template further comprises:
    i) a second set of attributes, said second set comprising default values for inclusion in said constructed entry;
    ii) a third set of attributes, said third set comprising attributes that are required to have assigned values; and
    iii) information specifying a program for verifying one or more attributes of said first set of attributes.

15. A computer readable medium as described in claim 14 wherein said template is an XML file.

16. A computer readable medium as described in claim 10 further comprising the step of detecting the condition of said constructed entry being unacceptable for addition to said directory information tree.

17. A computer readable medium as described in claim 10 wherein said template is an XML file.

18. A computer readable medium as described in claim 10 wherein said directory information tree is an LDAP directory.

19. In a computing device, a method of adding an entry to a directory information tree comprising:
   A) passing a template name to an application program interface, said named template comprising structural information of said directory information tree;
   B) receiving said template name;
   C) reading a template according to said received template name, said template comprising:
      i) structural information of said directory information tree;
      ii) a second set of attributes, said second set comprising default attribute values;
      iii) a third set of attributes, said third set comprising attributes that are required to have assigned values; and
      iv) information specifying a verification program;
   D) passing a first set of attributes to said application program interface, said passed first set of attributes not including a location for said entry within said directory information tree;
   E) receiving said first set of attributes;
   F) verifying of one or more attributes of said first set of attributes using said verification program;
   G) constructing said entry comprising:
      i) said received first set of attributes;
      ii) said second set of attributes; and
      iii) a destination location within said directory information, said destination location generated using said structural information;
   H) detecting the condition of said constructed entry being unacceptable for addition to said directory information tree; at least one said condition being the absence of a value for any attribute in said third set of attributes;
   I) if said constructed entry is unacceptable, generating an error condition; and
   J) adding said constructed entry to said directory information tree at said destination location.

* * * * *

UNITED STATES PATENT AND TRADEMARK OFFICE
CERTIFICATE OF CORRECTION

PATENT NO. : 6,970,873 B2
DATED : November 29, 2005
INVENTOR(S) : Chi-Hung Fu

It is certified that error appears in the above-identified patent and that said Letters Patent is hereby corrected as shown below:

Column 10,
Line 63, remove "the step of" and replace the second "the" with -- a --.

Signed and Sealed this

Fourteenth Day of February, 2006

JON W. DUDAS
*Director of the United States Patent and Trademark Office*